US009946039B2

(12) United States Patent
Du et al.

(10) Patent No.: US 9,946,039 B2
(45) Date of Patent: Apr. 17, 2018

(54) OPTICAL TRANSCEIVER MODULE

(71) Applicant: InnoLight Technology (Suzhou) LTD., Suzhou, Jiangsu (CN)

(72) Inventors: Yinchao Du, Jiangsu (CN); Shuaijie Wang, Jiangsu (CN); Weilong Li, Jiangsu (CN); Gaohong Shi, Jiangsu (CN)

(73) Assignee: InnoLight Technology (Suzhou) LTD., Suzhou (CN)

( * ) Notice: Subject to any disclaimer, the term of this patent is extended or adjusted under 35 U.S.C. 154(b) by 269 days.

(21) Appl. No.: 14/696,975

(22) Filed: Apr. 27, 2015

(65) Prior Publication Data
US 2015/0365171 A1 Dec. 17, 2015

(30) Foreign Application Priority Data

Jun. 11, 2014 (CN) .......................... 2014 1 0257312

(51) Int. Cl.
*G02B 6/42* (2006.01)
*G02B 6/36* (2006.01)
(52) U.S. Cl.
CPC ......... *G02B 6/4243* (2013.01); *G02B 6/3644* (2013.01); *G02B 6/4292* (2013.01)
(58) Field of Classification Search
CPC ....................................... G02B 6/32
(Continued)

(56) References Cited

U.S. PATENT DOCUMENTS 4,961,622 A * 10/1990 Gorman .................. G02B 3/04
359/708
5,222,168 A * 6/1993 Saito .................. G02B 6/3825
156/158

(Continued)

FOREIGN PATENT DOCUMENTS

| CN | 101158737 A | 4/2008 |
| CN | 103217750 A | 7/2013 |
| EP | 1909125 A1 | 4/2008 |

OTHER PUBLICATIONS

"Fixed." Merriam-Webster.com. Accessed Mar. 17, 2017. https://www.merriam-webster.com/dictionary/fixed.f.*

(Continued)

*Primary Examiner* — David Payne
*Assistant Examiner* — Tanya Motsinger
(74) *Attorney, Agent, or Firm* — Finnegan, Henderson, Farabow, Garrett & Dunner, LLP

(57) ABSTRACT

An optical transceiver module includes an optical fiber and an optical fiber positioning structure that fixes the optical fiber. The optical fiber positioning structure includes a first positioning part that fixes the said optical fiber, and a first supporting part that fixes the first positioning part on a case of the optical transceiver module. The first positioning part includes a first end face and a second end face opposite to one another, and a first through-hole that connects the first and second end faces. The inner diameter of the first through-hole is substantially equal to the diameter of the optical fiber, and the optical fiber is fixed within the first through-hole. The first supporting part includes an accommodating portion for accommodating the first positioning part. The first positioning part is fixed in the accommodating portion.

16 Claims, 4 Drawing Sheets

(58) Field of Classification Search
USPC .......................................................... 398/139
See application file for complete search history.

(56) References Cited

U.S. PATENT DOCUMENTS

| | | | | |
|---|---|---|---|---|
| 5,400,421 | A * | 3/1995 | Takahashi | G02B 6/2804 385/24 |
| 5,579,425 | A * | 11/1996 | Lampert | G02B 6/3869 385/55 |
| 6,250,817 | B1 * | 6/2001 | Lampert | G02B 6/3879 385/137 |
| 6,386,767 | B1 * | 5/2002 | Naghski | G02B 6/3873 385/52 |
| 6,419,401 | B1 * | 7/2002 | Taira | G02B 6/381 385/55 |
| 6,419,405 | B1 * | 7/2002 | Boscha | G02B 6/32 385/137 |
| 6,485,192 | B1 * | 11/2002 | Plotts | G02B 6/3825 385/71 |
| 6,629,780 | B2 * | 10/2003 | Kang | G02B 6/38 385/60 |
| 7,056,034 | B2 * | 6/2006 | Togami | G02B 6/4204 385/88 |
| 7,077,686 | B2 * | 7/2006 | Seo | G02B 6/4292 439/372 |
| 7,350,984 | B1 * | 4/2008 | Togami | G02B 6/4201 385/139 |
| 7,566,175 | B2 * | 7/2009 | Scheibenreif | G02B 6/3869 385/55 |
| 7,665,908 | B2 * | 2/2010 | Nelson | G02B 6/4201 385/14 |
| 8,109,676 | B2 * | 2/2012 | Zhovnirovsky | G02B 6/32 385/100 |
| 8,265,432 | B2 * | 9/2012 | Doany | G02B 6/4201 257/432 |
| 8,727,639 | B2 * | 5/2014 | Matsui | G02B 6/4201 385/53 |
| 2001/0024551 | A1 * | 9/2001 | Yonemura | G02B 6/4246 385/88 |
| 2002/0181893 | A1 * | 12/2002 | White | G02B 6/3887 385/86 |
| 2003/0007748 | A1 * | 1/2003 | Ide | G02B 6/4292 385/88 |
| 2003/0108301 | A1 * | 6/2003 | Bates, III | G02B 6/3878 385/59 |
| 2003/0128937 | A1 * | 7/2003 | Sato | G02B 6/4204 385/78 |
| 2003/0152336 | A1 * | 8/2003 | Gurevich | G02B 6/4206 385/88 |
| 2003/0169978 | A1 * | 9/2003 | Sato | G02B 6/3846 385/88 |
| 2004/0028349 | A1 * | 2/2004 | Nagasaka | G02B 6/4204 385/88 |
| 2004/0146252 | A1 * | 7/2004 | Healy | G02B 6/4206 385/88 |
| 2004/0156595 | A1 * | 8/2004 | Stockhaus | G02B 6/4246 385/88 |
| 2004/0161205 | A1 * | 8/2004 | Hengelmolen | G02B 6/3834 385/78 |
| 2004/0240799 | A1 * | 12/2004 | Cheng | G02B 6/4292 385/92 |
| 2005/0123248 | A1 * | 6/2005 | Sakurai | B29C 45/2628 385/78 |
| 2005/0185963 | A1 * | 8/2005 | Ice | G02B 6/4246 398/135 |
| 2006/0171639 | A1 * | 8/2006 | Dye | G02B 6/3843 385/78 |
| 2007/0127258 | A1 | 6/2007 | Wang et al. | |
| 2008/0019643 | A1 * | 1/2008 | Teo | G02B 6/4292 385/76 |
| 2008/0037938 | A1 * | 2/2008 | Kiani | G02B 6/3825 385/78 |
| 2009/0220198 | A1 * | 9/2009 | Sheau Tung Wong | G02B 6/3878 385/71 |
| 2009/0297159 | A1 * | 12/2009 | Margolin | G02B 6/4201 398/135 |
| 2010/0111484 | A1 * | 5/2010 | Allen | G02B 6/3849 385/135 |
| 2011/0044591 | A1 * | 2/2011 | Yoshikawa | G02B 6/4246 385/88 |
| 2011/0229093 | A1 * | 9/2011 | McColloch | G02B 6/4246 385/92 |
| 2012/0045182 | A1 * | 2/2012 | Ishii | G02B 6/4201 385/92 |
| 2014/0294395 | A1 * | 10/2014 | Waldron | G02B 6/3823 398/115 |
| 2015/0103336 | A1 * | 4/2015 | Rolston | G01M 11/35 356/73.1 |
| 2015/0365171 | A1 * | 12/2015 | Du | G02B 6/4243 398/139 |
| 2015/0378107 | A1 * | 12/2015 | Akashi | G02B 6/421 398/139 |

OTHER PUBLICATIONS

"Adjust." Merriam-Webster.com. Accessed Mar. 17, 2017. https://www.merriam-webster.com/dictionary/adjust.*

* cited by examiner

OPTICAL TRANSCEIVER MODULE

CROSS-REFERENCE TO RELATED APPLICATION

This application claims the benefit of priority to Chinese Application No. 2014-10257312.0, filed Jun. 11, 2014.

FIELD OF THE DISCLOSURE

This disclosure relates to the field of optical communications and, more particularly, to an optical transceiver module.

BACKGROUND

With the development of science and technology, high-speed signal transmission technologies have been widely applied. Compared to electrical transmission, optical connection can transmit signals over a much wider bandwidth and can use signal transmission systems with optical transceiver modules that are much smaller in size and lower in power consumption. Therefore, in the field of high-speed signal transmission technology, attention has been directed to optical connection for signal transmission between devices. Accordingly, optical transceiver modules installed as electric components in computers, automobiles, etc., have been widely used.

When an optical transceiver module is in use, optical fibers need to be coupled with chips, lenses, etc., on the transmitting end and/or receiving end of the optical transceiver module. Accordingly, in order to achieve a better coupling effect, the optical fibers need to be fixed within a specified position within the optical transceiver module. The optical coupling effect is directly affected by whether the optical fibers are fixed precisely in the specified position in the optical transceiver module.

A commonly used optical fiber positioning structure has V-grooves on a substrate. The optical fibers are placed in the V-grooves, which are filled with an adhesive to fix the optical fibers within the grooves. Then, a cover plate is adhered with a curable adhesive onto the surface of the substrate on which the V-grooves are disposed.

In the aforementioned structure, the V-groove is disposed on the substrate. It is very difficult for the V-groove to precisely match the outer diameter of the optical fibers. In addition, it is easy for the optical fibers to fall out of the V-groove in the process of being fixed within position. As a result, it is very difficult to precisely control the position in which said optical fibers are fixed. This leads to reduced precision of the installation of the optical fibers and worsening of the coupling effect for the optical transceiver module.

SUMMARY

In order to address the aforementioned problem, this disclosure provides an optical transceiver module. The optical transceiver module can fix the position of the optical fibers more precisely and thus improve the coupling effect of the optical transceiver module.

According to an embodiment of the disclosure, an optical transceiver module includes an optical fiber and an optical fiber positioning structure for fixing the optical fiber. The optical fiber positioning structure includes a first positioning part that fixes the optical fiber, and a first supporting part that fixes the first positioning part on a case of the optical transceiver module. The first positioning part includes a first end face, a second end face opposite to the first end face, and a first through-hole that connects the first end face and second end face. The inner diameter of the first through-hole is substantially equal to the diameter of the optical fiber, such that said optical fiber may be fixed within the first through-hole. The first supporting part includes an accommodating portion for accommodating the first positioning part. The first positioning part is fixed in the accommodating portion.

According to a further embodiment of the disclosure, the material of the first positioning part is ceramics or resin.

According to a further embodiment of the disclosure, the optical fiber is fixed within the first through-hole in an adjustable manner.

According to a further embodiment of the disclosure, the first positioning part is fixed in the accommodating portion in an adjustable manner.

According to a further embodiment of the disclosure, the optical fiber positioning structure includes a plurality of first positioning parts. The plurality of first positioning parts are disposed side by side in the first supporting part.

According to a further embodiment of the disclosure, each optical fiber includes a first end face close to a side where a light transmitting interface and/or a light receiving interface are located. The first ends of the optical fibers and the first end faces of the first positioning parts are disposed set in substantially the same plane.

According to a further embodiment of the disclosure, the first positioning parts are fixed in the accommodating portion of the first supporting part by means of engaging, welding, or adhering.

According to a further embodiment of the disclosure, the first supporting part includes a third end face close to a side where the light transmitting interface and/or the light receiving interface are located, and a fourth end face opposite to the third end face. The accommodating portion of the first supporting part includes a plurality of second through-holes that connect the third end face and the fourth end face. Each first positioning part is tightly fitted and connected to a corresponding one of the second through-holes of the first supporting part.

According to a further embodiment of the disclosure, the shape of the main body of each first positioning part is cylindrical, and the two end faces of the cylinder respectively constitute the first end face and the second end face of the first positioning part.

According to a further embodiment of the disclosure, the first end faces of the first positioning parts and the third end face of the first supporting part are disposed in substantially the same plane.

According to a further embodiment of the disclosure, the first supporting part further includes a side surface that connects the third end face and the fourth end face, and a plurality of openings that connect to the second through-holes disposed on the side surface. The openings extend from the third end face to the fourth end face of the first supporting part.

According to a further embodiment of the disclosure, a first positioning slot or a first positioning protection is set on the outside of the main body of at least one first positioning part. A second positioning projection or a second positioning slot that matches the first positioning slot or first positioning projection is set within at least one second through-hole of the first supporting part.

According to a further embodiment of the disclosure, the optical fiber positioning structure is disposed on a receiving end of the optical transceiver module.

According to a further embodiment of the disclosure, the optical fiber positioning structure further includes a plurality of second positioning parts that fix the first positioning parts. The second positioning parts are disposed in the first supporting part. Each second positioning part includes a fifth end face close to a side where the light transmitting interface and/or the light receiving interface are located, a sixth end face set opposite to the fifth end face, and a third through-hole that connects the fifth end face and the sixth end face. The first positioning parts match and connect within corresponding ones of the third through-holes.

According to a further embodiment of the disclosure, the first positioning parts are fixed in the second positioning parts in an adjustable manner.

According to a further embodiment of the disclosure, the second positioning parts are disposed in the first supporting part in an adjustable manner.

According to a further embodiment of the disclosure, the axial length of the first through-holes of the first positioning parts is greater than or equal to the axial length of the third through-holes of the second positioning parts.

According to a further embodiment of the disclosure, the second positioning parts and the first supporting part are directly or indirectly connected in a removable manner.

According to a further embodiment of the disclosure, the first supporting part includes a third end face close to a side where the light transmitting interface and/or the light receiving interface are located, and a fourth end face opposite to the third end face. The distance between the fifth end faces of the second positioning parts and the third end face of the first supporting part is substantially the same.

According to a further embodiment of the disclosure, the optical fiber positioning structure further includes an orienting part. The orienting part is disposed between the first supporting part and the second positioning parts, and is used to connect the first supporting part and the second positioning parts in a removable manner.

According to a further embodiment of the disclosure, the optical fiber positioning structure further includes a lens assembly. The lens assembly includes a deck and a plurality of lenses placed on the deck. The deck is disposed between the first supporting part and the orienting parts, and is used to connect the first supporting part and the orienting parts in a removable manner.

According to a further embodiment of the disclosure, the optical fiber positioning structure is disposed on a transmitting end of the optical transceiver module.

Optical transceiver modules provided by certain embodiments of the disclosure include an optical fiber positioning structure, and the optical fiber positioning structure includes the first positioning part and the first supporting part that fixes the first positioning part on a case of the optical transceiver module. When the first supporting part is fixed on the case, the position of the first supporting part on the case can be controlled precisely. When the first positioning part is fixed on the first supporting part, the position of the first positioning part on the first supporting part can be more precisely controlled through appropriate modulation, and the position of the optical fibers relative to the first positioning part can also be controlled more precisely. In this manner, the optical transceiver module may have a better optical fiber coupling effect and a more reliable optical path. In addition, the position of the first positioning part relative to the first supporting part can be adjusted to an optimal position before it is fixed, enabling greater improvement in the coupling effect.

DETAILED DESCRIPTION

Figure 1:
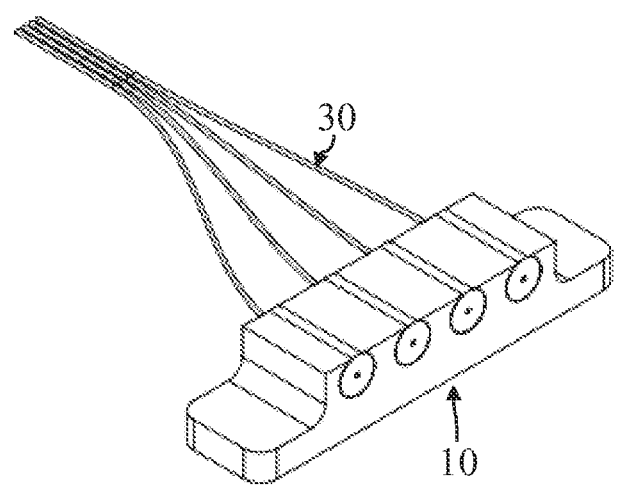
FIG. 1 is a schematic drawing showing an optical fiber positioning structure in an optical transceiver module, according to a first embodiment of the disclosure.

The text below provides detailed descriptions of embodiments of the disclosure as shown in the drawings. However, these embodiments do not limit the disclosure. The scope of the disclosure covers any changes made to the structure, method, or function by those of ordinary skill in the art based on the embodiments.

In order to facilitate the description, detailed descriptions are given from the perspective of a hypothetical observing operator. Up (upper), down (lower), left, and right in the text below are all relative perspectives.

An optical transceiver module may include a case, and a circuit board, a light transmitting assembly, and/or a light receiving assembly (not specifically shown in the drawings) disposed in the case. The light transmitting assembly may include an optical transmitter and a light transmitting interface. The light receiving assembly may include a light receiver and a light receiving interface. The connection between the optical transmitter and the light transmitting interface, and/or the connection between the optical receiver and the light receiving interface, may be realized by optical fibers. The optical signal transmitted from the optical transmitter passes through the light transmitting interface and reaches the optical fibers, and then the optical fibers transmit the optical signal. The optical signal transmitted from the optical fibers passes through the light receiving interface and reaches the optical receiver.

FIG. 1 is a schematic diagram showing an optical fiber positioning structure in an optical transceiver module, according to a first embodiment of the disclosure.

Figure 7:
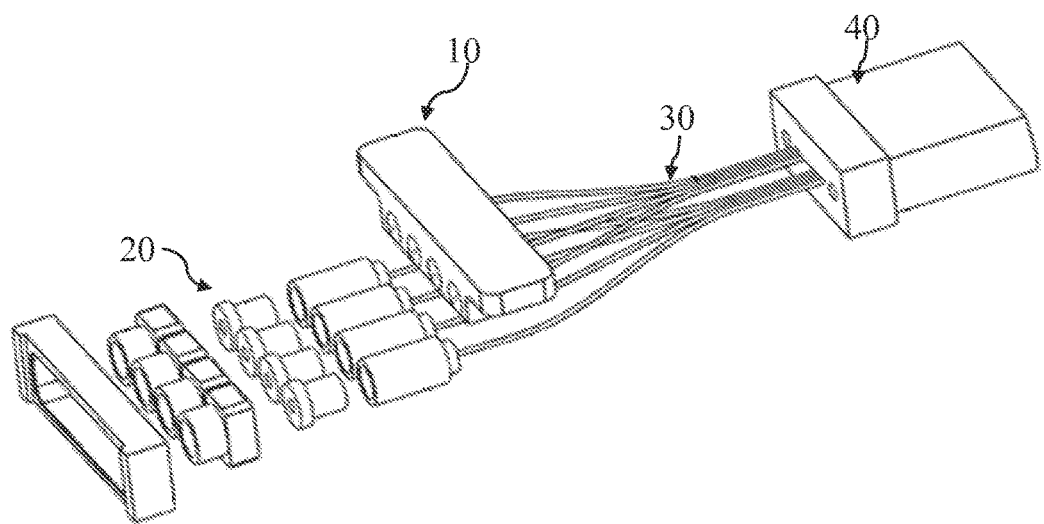
FIG. 7 is an assembly drawing of multiple optical fiber positioning structures of an optical transceiver module, according to an embodiment of the disclosure.

The optical transceiver module of FIG. 1 includes optical fibers 30 and an optical fiber positioning structure 10. The optical fiber positioning structure 10 is used for clamping and orienting the optical fibers 30, in order to fix the optical fibers 30 in the optical transceiver module. The optical transceiver module also includes a connector 40 that connects to the optical fibers 30, as illustrated in FIG. 7.

There is no specific limit on the number of the optical fibers 30, and there can be one fiber or multiple optical fibers. Each one of optical fibers 30 includes a first end and a second end that are opposite to each other. The first end matches and connects to the optical fiber positioning structure 10. The second end connects to the connector 40 in a removable manner.

Figure 2:
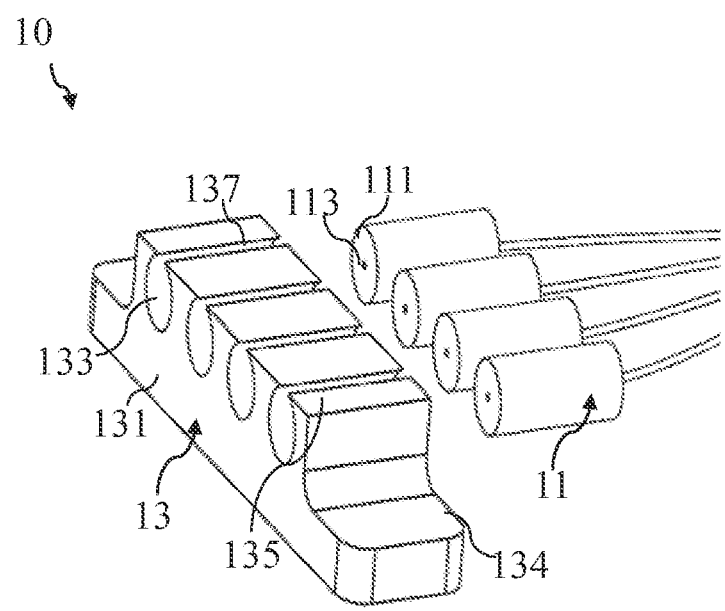
FIG. 2 is an exploded-view drawing of the optical fiber positioning structure in FIG. 1.

FIG. 2 is an exploded-view drawing of the optical fiber positioning structure 10 of FIG. 1. The optical fiber positioning structure 10 includes a plurality of first positioning parts 11 for fixing the optical fibers 30, and a first supporting part 13 for fixing the first positioning parts 11. The number of the first positioning parts 11 is determined by the number of the optical fibers 30 to be carried. In the illustrated embodiment, the optical transceiver module includes four optical fibers 30. Each first positioning part 11 includes a first end face 111 close to the side where the light transmitting interface and/or the light receiving interface are located, a second end face (not shown specifically in the drawing) opposite to the first end face 111, and a first through-hole 113 that connects the first end face 111 and the second end face. The first end of each optical fiber 30 matches and is fixed within a corresponding one of the first through-holes 113. The size of the first through-holes 113 is determined by the outer diameter of the optical fibers 30 to be carried. In some embodiments, the optical fibers 30 are fixed within the corresponding first through-holes 113 in an adjustable manner.

The first supporting part 13 is used to be connected to the optical transceiver module in a removable manner, and is used to carry the first positioning parts 11 and to fix the first positioning parts 11 on the case of the optical transceiver module. The first supporting part 13 includes a third end face 131 close to the side where the light transmitting interface and/or the light receiving interface are located, a fourth end face (not shown specifically in the drawing) opposite to the third end face 131, and an accommodating portion that accommodates the first positioning parts 11. In some embodiments, the first positioning parts 11 are fixed in the accommodating portion in an adjustable manner.

The accommodating portion of the first supporting part 13 includes a plurality of second through-holes 133 each connecting the third end face 131 and the fourth end face. The number of the second through-holes 133 is determined by the number of the first positioning parts 11 to be accommodated. The shape of the second through-holes 133 is determined by the external shape of the first positioning parts 11 to be accommodated.

When there are multiple optical fibers 30, each first positioning part 11 may be tightly fitted and connected in a corresponding second through-hole 133 of the first supporting part 13.

The shapes of the first through-holes 113 and the second through-holes 133 can be formed by multiple means. For example, the first through-holes 113 and the second through-holes 133 are formed by means of etching, etc., in the first positioning parts 11 and the first supporting part 13, respectively.

In some embodiments, the first ends of the optical fibers 30 are bare fibers. In some embodiments, the length of the bare fiber end is substantially equal to the axial length of the first through-holes 113. In this manner, when the optical fibers 30 are connected to the corresponding first positioning parts 11, it can be determined through observation whether the optical fibers 30 are already installed into fixed positions of the first positioning parts 11.

In some embodiments, the outer diameter of the bare fibers is smaller than or equal to the inner diameter of the first through-holes 113, in order to facilitate the insertion of the bare fibers into the corresponding first through-holes 113. In some embodiments, the outer diameter of the bare fibers is substantially equal to the inner diameter of the first through-holes 113, such that the bare fibers can be tightly fitted to the corresponding first positioning parts 11 without any additional mechanism when the bare fibers reach their predetermined positions in the corresponding first through-holes 113. In an actual application, the outer diameter of the bare fibers can be smaller than the inner diameter of the first through-holes 113. Furthermore, when the bare fibers reach the predetermined positions in the corresponding first through-holes 113, the bare fibers can be tightly fitted to the corresponding first positioning parts 11 by using other structures. For example, the bare fibers can be glued in the corresponding first through-holes 113 with an adhesive.

In some embodiments, in an initial state, the first ends of the optical fibers 30 enter into the corresponding first through-holes 113 through the second end faces of the first positioning parts 11. Finally, the first ends of the optical fibers 30 and the corresponding first end faces 111 are configured in substantially the same plane.

There is no specific limit on the material of the first positioning parts 11. In some embodiments, the material of the first positioning parts 11 is ceramics or resin. There is no specific limit on the external shape of the first positioning parts 11. In the illustrated embodiment, in order to better facilitate the attachment of the first positioning parts 11 to the first supporting part 13, the structure of the first positioning parts 11 has a regular shape, for example, a cylinder, a cube, a cuboid, a regular polyhedron, etc.

In some embodiments, the main bodies of the first positioning parts 11 are formed as cylinders. The two end faces of the cylinders constitute the first end faces 111 and the second end faces of the first positioning parts 11, respectively, in order to facilitate the attachment of the first positioning parts 11 to the first supporting part 13.

In some embodiments, the first positioning parts 11 are fixed within the corresponding second through-holes 133 of the first supporting part 13 by means of, for example, engaging, welding, or adhering, etc.

In the optical transceiver module of the illustrated embodiment, the third end face 131 is disposed on a side close to the light transmitting interface or the light receiving interface, in order to couple the input or output of the optical signal transmitted by the optical fibers 30.

When there are multiple optical fibers 30, the first positioning parts 11 may be fixed in the first supporting part 13 in specific positions. In particular, the distances between the first end faces 111 and the third end face 131 may be configured to be substantially equal, in order to facilitate the coupling of the light transmitting interface or light receiving interface with the optical fibers 30. For example, when the light transmitting interface is coupled with the optical fibers 30, the first positioning parts 11 can be adjusted according to the positions of the two through-holes 113 at the far ends of the first positioning parts 11 relative to the light transmitting interface, in order to couple all the optical fibers 30 into the right positions. Such operation is convenient, saves time needed for adjustment, and improves coupling efficiency. In the process of attaching the first positioning parts 11 to the first supporting part 13, the first positioning parts 11 can be moved along the axial direction of the second through-holes 133 of the first supporting part 13, in order to adjust the distances between the first end faces 111 and the third end face 131.

When the optical fiber positioning structure 10 includes multiple first positioning parts 11, the multiple first positioning parts 11 may be disposed side by side on the first supporting part 13.

In some embodiments, the first end faces 111 and the third end face 131 are disposed in substantially the same plane.

In some embodiments, a first positioning slot or a first positioning projection (not illustrated in the drawings) is disposed on the outside of the main body of at least one first positioning part 11, and a second positioning projection or a second positioning slot (not shown specifically in the drawing) that matches the first positioning slot or the first positioning projection on the main body of the at least one first positioning part 11 is disposed in at least one second through-hole 133 of the first supporting part 13, in order to precisely control the position of the first positioning parts 11 in the first supporting part 13.

In the embodiment of FIG. 2, step-shaped platforms 134 are disposed symmetrically on the two opposite sidewalls of the first supporting part 13, in order to facilitate the precise fixing and installation of the first supporting part 13 in the optical transceiver module. The external shape of the first supporting part 13 can be configured with other structures in order to fix the first supporting part 13 in the optical transceiver module. The details will not be repeated here.

In some embodiments, the first supporting part 13 also includes a side surface 135 that connects the third end face 131 and the fourth end face. Openings 137 that respectively connect to the second through-holes 133 are disposed on the side surface 135. In the process of tightly fitting and connecting the first positioning parts 11 to the first supporting part 13, the first positioning part 11 can enter into and be fixed onto the first supporting part 13 from multiple angles. For example, the first positioning parts 11 can enter into the first supporting part 13 from the third end face 131 or fourth end face, and can be fixed within the first supporting part 13 as needed.

The openings 137 extend from the third end face 131 to the fourth end face of the first supporting part 13. The length of the openings 137 along a vertical direction of the first supporting part 13 is substantially equal to the axial length of the second through-holes 133. For example, at least one opening 137 may be a slit having substantially the same cross-section along an axial direction of the corresponding second through-hole 133.

A person with ordinary skill in the art would appreciate that the openings 137 can also have an irregular shape. For example, two sides of at least one opening 137 may be in the shape of a pair of open zippers, etc. That is, each side of the opening 137 may include a plurality of convex shapes and concave shaped alternately arranged along the axial direction, and the convex shapes at one side of the opening 137 are disposed corresponding to the concave shapes at the other side of the opening.

In some embodiments, the inner diameter of the second through-holes 133 is smaller than or equal to the outer diameter of the first positioning parts 11, and the radial width of the opening 137 is smaller than the diameter of the second through-holes 133, in order to facilitate the fitting and installation of the first positioning parts 11 onto the first supporting part 13. With this structural setup, the first positioning parts 11 can be tightly fixed and connected within the first supporting part 13 without any aid such as adhesive.

A person with ordinary skill in the art would appreciate that, in an actual application, when the relative distances between the optical fibers 30 and the light transmitting interfaces or the light receiving interfaces are not correctly matched, since the first positioning parts 11 and the first supporting part 13 are fixed to one another in the tightly fitted manner, the distances between the first positioning parts 11 and the first supporting part 13 can be adjusted by exerting a certain amount of an external force on the first positioning parts 11. Furthermore, the relative distances between the optical fibers 30 and the light transmitting interfaces or the light receiving interfaces can be adjusted as needed.

In current technologies, the optical fibers are glued in V-grooves with an adhesive. When the positions of the optical fibers are incorrect, the positions cannot be adjusted because the positions of the optical fibers are fixed. Therefore, the entire optical fiber positioning structure needs to be replaced and components such as the optical fibers and the connector need to be replaced accordingly. With the optical fiber positioning structure 10 in this embodiment, adjustments can be made as needed, and the structure is more reasonable.

The optical fiber positioning structure 10 in the illustrated embodiment of the disclosure is especially suited for installation on the receiving end of the optical electrical transceiver module, because the optical fiber positioning structure 10 has features such as a short debugging process and a high degree of coupling precision.

Compared to current technologies, the optical transceiver module provided by this embodiment includes an optical fiber positioning structure 10. The optical fiber positioning structure 10 includes the first positioning parts 11 and the first supporting part 13 that fixes the first positioning parts 11 on the case of the optical transceiver module. When the first supporting part 13 is fixed on the case, the position of the first supporting part 13 on the case can be controlled precisely. When the first positioning parts 11 are fixed in the first supporting part 13, the position of the first positioning parts 11 in the first supporting part 13 can be precisely controlled through appropriate modulation, and the position of the optical fibers 30 relative to the first positioning parts 11 can also be controlled precisely. In this manner, the optical transceiver module has a better optical fiber coupling effect and a more reliable optical path. In addition, the position of the first positioning parts 11 relative to the first supporting part 13 can be adjusted to an ideal position before it is fixed, enabling greater improvement in the coupling effect.

Figure 3:
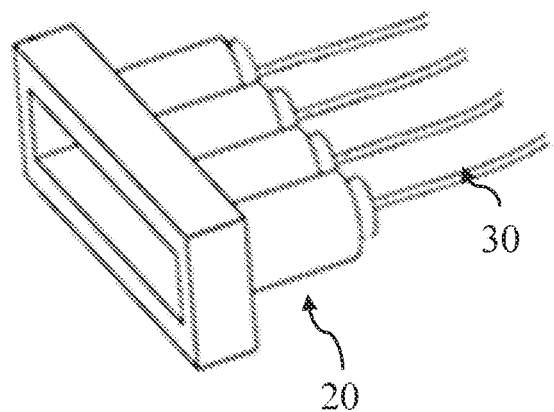
FIG. 3 is a schematic drawing showing an optical fiber positioning structure in an optical transceiver module, according to a second embodiment of the disclosure.

FIG. 3 is a schematic diagram showing an optical fiber positioning structure in an optical transceiver module, according to a second embodiment of the disclosure. In this embodiment, some of the structures are described with same terms that are used to describe the first embodiment. However, the same way of description does not mean that the structures or functions are the same. In this embodiment, this is only to simplify the description. Accordingly, the same terms are labeled with different numbers to indicate the distinctions.

Accordingly, the optical transceiver module of this disclosure includes optical fibers 30 and an optical fiber positioning structure 20. The optical fiber positioning structure 20 is used to clamp and orient the optical fibers 30 in order to fix the optical fibers 30 in the optical transceiver module. The optical transceiver module also includes a connector 40 that connects to the optical fibers 30, as illustrated in FIG. 7.

There is no specific limit on the number of the optical fibers 30, and there can be one fiber or multiple optical fibers. Each one of optical fibers 30 includes a first end and a second end that are opposite to each another. The first end matches and connects to the optical fiber positioning structure 20. The second end connects to the connector 40 in a removable manner.

Figure 4:
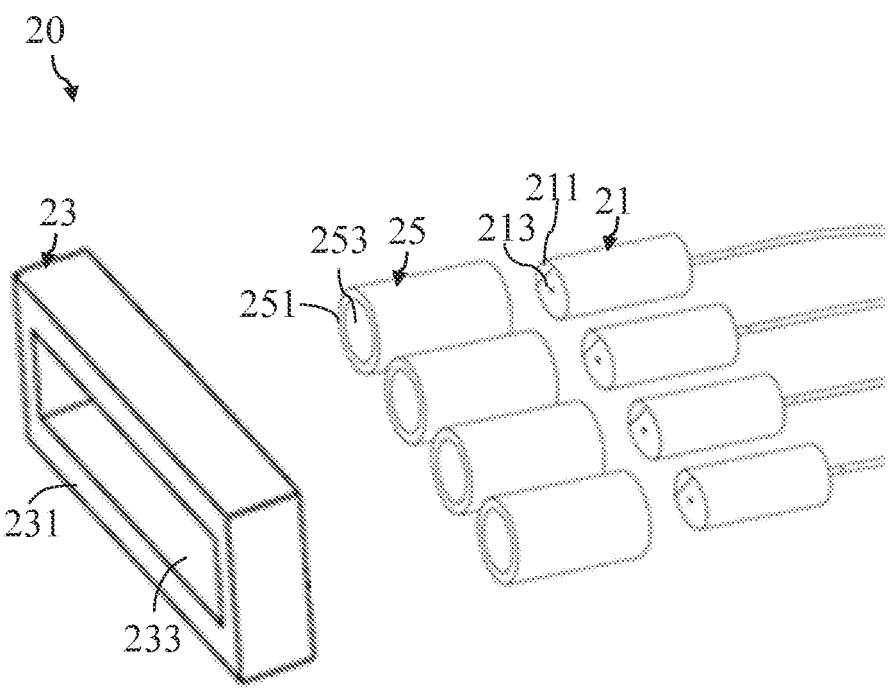
FIG. 4 is an exploded-view drawing of the optical fiber positioning structure in FIG. 3.

FIG. 4 is an exploded-view drawing of the optical fiber positioning structure 20 of FIG. 3. The optical fiber positioning structure 20 includes a plurality of first positioning parts 21 for fixing the optical fibers 30, a plurality of second positioning parts 25 for fixing the first positioning parts 21, and a first supporting part 23 for fixing the second positioning parts 25.

In some embodiments, the first positioning parts 21 are fixed in the second positioning parts 25 in an adjustable manner.

In some embodiments, the second positioning parts 25 are fixed in the first supporting part 23 in an adjustable manner.

The number of the first positioning parts 21 is determined by the number of the optical fibers 30 to be carried. In the illustrated embodiment, the optical transceiver module includes four optical fibers 30.

Each first positioning part 21 includes a first end face 211 close to the side where the light transmitting interface and/or the light receiving interface are located, a second end face (not shown specifically in the drawing) opposite to the first end face 211, and a first through-hole 213 that connects the first end face 211 and the second end face.

The first end of each optical fiber 30 matches and is fixed within the first through-hole 213 of a corresponding first positioning part 21. The size of the first through-holes 213 is determined by the outer diameter of the optical fibers 30 to be carried.

Each second positioning part 25 includes a fifth end face 251 close to the side where the light transmitting interface and/or the light receiving interface are located, a sixth end face (not shown specifically in the drawing) opposite to the fifth end face 251, and a third through-hole 253 that connects the fifth end face 251 and the sixth end face. Each first positioning part 21 matches and connects within the third through-hole 253 of a corresponding second positioning part 25. The shape of the third through-holes 253 is determined by the external shape of the first positioning parts 21. The number of the second positioning parts 25 is determined by the number of the first positioning parts 21 to be carried.

The first supporting part 23 includes a third end face 231 close to the side where the light transmitting interface and/or the light receiving interface are located, a fourth end face (not shown specifically in the drawing) opposite to the third end face 231, and an accommodating portion 233 that accommodates the first positioning parts 21. The first supporting part 23 is used to be connected to the optical transceiver module in a removable manner, and is used to carry the second positioning parts 25 and to fix the second positioning parts 25 on the case of the optical transceiver.

The shapes of the first through-holes 213, the accommodating portion 233, and the third through-holes 253 can be formed by multiple means. For example, the first through-holes 213, the accommodating portion 233, and the third through-holes 253 may be formed by means of etching, etc., in the first positioning parts 21, the first supporting part 23, and the second positioning parts 25, respectively.

In some embodiments, the first ends of the optical fibers 30 are bare fiber.

In some embodiments, the length of the bare fibers is substantially equal to the axial length of the first through-holes 213. In this manner, when the optical fibers 30 are matched and connected to the corresponding first positioning parts 21, it can be determined through observation whether the optical fibers 30 are already installed into fixed positions of the first positioning parts 21.

In some embodiments, the outer diameter of the bare fibers is smaller than or equal to the inner diameter of the first through-holes 213, in order to facilitate the insertion of the bare fibers into the first through-holes 213.

In some embodiments, the outer diameter of the bare fibers is substantially equal to the inner diameter of the first through-holes 213. Since the outer diameter of the bare fibers is substantially equal to the inner diameter of the first through-holes 213, the bare fibers can be tightly fitted to the corresponding first positioning parts 21 without any additional mechanism when the bare fibers reach their predetermined positions in the corresponding first through-holes 213.

In an actual application, the outer diameter of the bare fibers can be smaller than the inner diameter of the first through-holes 213. Furthermore, when the bare fibers reach the predetermined positions in the corresponding first through-holes 213, the bare fibers can be tightly fitted to and the corresponding first positioning parts 21 by using other structures. For example, the bare fibers can be glued in the corresponding first through-holes 213 with an adhesive.

In some embodiments, in an initial state, the first ends of the optical fibers 30 enter into the corresponding first through-holes 213 through the second end faces of the first positioning parts 21. Finally, the first end, of the optical fibers 30 and the corresponding first end faces 211 are configured in substantially the same plane.

There is no specific limit on the material of the first positioning parts 21. In some embodiments, the material of the first positioning parts 21 is ceramics or resin.

There is no specific limit on the external shape of the first positioning parts 21. In the illustrated embodiment, in order to better facilitate the attachment of the first positioning parts 21 to the second positioning parts 25, the structure of the first positioning parts 21 has a regular shape, for example, a cylinder, a cube, a cuboid, a regular polyhedron, etc.

In some embodiments, the main bodies of the first positioning parts 21 are formed as cylinders. The two end faces of the cylinders constitute the first end faces 211 and the second end faces of the first positioning parts 21, respectively, in order to facilitate the matching and connection of the first positioning parts 21 to the second positioning parts 25. The shape of the third through-holes 253 of the second positioning parts 25 matches the external shape of the first positioning parts 21, in order to facilitate the matching and connection of the second positioning parts 25 to the first positioning parts 21.

In some embodiments, the first positioning parts 21 are fixed within the third through-holes 253 of the corresponding second positioning parts 25 by means of, for example, engaging, welding, or adhering, etc.

In the process of attaching the first positioning parts 21 to the second positioning parts 25, the first positioning parts 21 can be moved along the axial direction of the third through-holes 253 of the second positioning parts 25, in order to adjust the distance between the first end faces 211 and the corresponding fifth end faces 251, so as to couple the input or output of the optical signal transmitted by the optical fibers 30.

The third end face 231 of the first supporting part 23 is disposed on a side close to the light transmitting interface or the light receiving interface. The second positioning parts 25 are directly or indirectly connected in a removably manner to the first supporting part 23.

When there are multiple the optical fibers 30, multiple second positioning parts 25 may be disposed side by side in the first supporting part 23.

The distance between the first end faces 211 and the corresponding fifth end faces 251 are configured to be substantially the same. The distance between the fifth end faces 251 of the second positioning parts 25 and the third end face 231 of the first supporting part 23 are configured to be substantially the same.

In some embodiments, the first end faces 211, the third end face 231, and the fifth end faces 251 are disposed in substantially the same plane.

In some embodiments, the axial length of the third through-holes 253 is greater than the axial length of the first positioning parts 21, so that the first end faces 211 or the second end faces of the first positioning parts 21 are exposed outside of the end faces of the second positioning parts 25 when the first positioning parts 21 are matched and connected to the second positioning parts 25, in order to facilitate the clamping or orienting of the first positioning parts 21 when adjusting the position of the first positioning parts 21 in the third through-holes 253.

The axial length of the third through-holes 253 can also be smaller than or equal to the axial length of the first positioning parts 21. The details of such an embodiment will not be repeated here.

There is no specific limit on the external shape of the second positioning parts 25. In some embodiments, in order to better facilitate the attachment of the second positioning parts 25 to the first supporting part 23, and in order to facilitate the addition of components such as an orienting part or a lens into the second positioning parts 25, the structure of the second positioning parts 25 has a regular shape, for example, a cylinder, a cube, a cuboid, a regular polyhedron, etc.

In some embodiments, the main bodies of the first positioning parts 21 are formed as cylinders, and the outer diameter of the first positioning parts 21 is substantially equal to the inner diameter of the third through-holes 253. The main bodies of the second positioning parts 25 may also be formed as cylinders. With an external force, the first positioning parts 21 enter into the third through-holes 253 through the fourth end faces of the second positioning parts 25. Since the outer diameter of the first positioning parts 21 is substantially equal to the inner diameter of the third through-holes 253, the first positioning parts 21 can be tightly fitted to the second positioning parts 25 without any additional mechanism when the first positioning parts 21 reach their predetermined positions in the third through-holes 253. Meanwhile, when the relative distances between the optical fibers 30 and the light transmitting interfaces or the light receiving interfaces are not correctly matched, the distances between the first positioning parts 21 and the second positioning parts 25 can be adjusted by exerting a certain amount of external force on the first positioning parts 21, as the first positioning parts 21 and the second positioning parts 25 are fixed to one another in the tightly fitting manner. Furthermore, the relative distances between the optical fibers 30 and the light transmitting interfaces or the light receiving interfaces can be adjusted as needed.

In current technologies, the optical fibers are glued in V-grooves with an adhesive. When the positions of the optical fibers are incorrect, the positions cannot be adjusted because the positions of the optical fibers are fixed. Therefore, the entire optical fiber positioning structure needs to be replaced and components such as the optical fibers and the connector need to be replaced accordingly. With the optical fiber positioning structure 20 in this embodiment, adjustments can be made as needed, and the structure is more reasonable. In an actual application, the outer diameter of the first positioning parts 21 can also be set to be smaller than the inner diameter of the third through-holes 253. The details of such an embodiment will not be repeated here.

The first positioning parts 21 can be inserted and tightly fitted in the second positioning parts 25 by various means. For example, the first positioning parts 21 with the optical fibers 30 can be pressed into the second positioning parts 25 with a jig. In addition, the first positioning parts 21 may be fixed within the third through-holes 253 of the second positioning parts 25 by means of, for example, engaging, welding, or adhering, etc.

In some embodiments, the material of the second positioning parts 25 is metal.

In the process of attaching the aforementioned structures to one another, the second positioning parts 25 and the first supporting part 23 can be connected in a removable manner. Alternatively, the second positioning parts 25 may be welded onto the first supporting part 23. Still alternatively, bolt and nut structures may be set on the locations where the second positioning parts 25 and the first supporting part 23 are connected.

In the process of an actual application, the second positioning parts 25 can be omitted from the optical fiber positioning structure 20 in the second embodiment of the disclosure. Accordingly, the first positioning parts 21 are directly connected to the first supporting part 23. For example, the first positioning parts 21 are connected to the first supporting part 23 by means of, for example, adhering or welding.

The optical fiber positioning structure 20 in the second embodiment of the disclosure has multiple structures that can work with one another to adjust the distance. For example, with external forces, the optical fibers 30 can move back and forth along the axial direction of the first through-holes 213, and the first positioning parts 21 can move back and forth along the axial direction of the third through-holes 253. Therefore, the distance between the optical fibers 30 and an optical converter chip can be adjusted with flexibility. As a result, the optical fiber positioning structure in the second embodiment of the disclosure couples more precisely with the optical converter chip and has a higher degree of stability. It is especially suited for installation on the transmitting end of the optical electrical transceiver module.

The optical transceiver module provided by this embodiment includes an optical fiber positioning structure 20. The optical fiber positioning structure 20 includes the first positioning parts 21, the second positioning parts 25 that fixes the first positioning parts, and the first supporting part 23 that fixes the second positioning parts 25 on the case of the optical transceiver module. When the first supporting part 23 is fixed on the case, the position of the first supporting part 23 on the case can be controlled more precisely. When the second positioning parts 25 are fixed in the first supporting part 23, the position of the second positioning parts 25 in the first supporting part 23 can be more precisely controlled through appropriate adjustment. When the first positioning parts 21 is fixed in the second positioning parts 25, the position of the first positioning parts 21 in the second positioning parts 25 can be more precisely controlled through appropriate adjustment, and the position of the optical fibers 30 relative to the first positioning parts 21 can also be more precisely controlled. Therefore, the position of the optical fibers 30 can be more precisely controlled. In this manner, the optical transceiver module has a better optical fibers coupling effect and a more reliable optical path. In addition, the position of the first positioning parts 21 relative to the first supporting part 23 can be adjusted to an optimal position before it is fixed, enabling greater improvement in the coupling effect.

Figure 5:
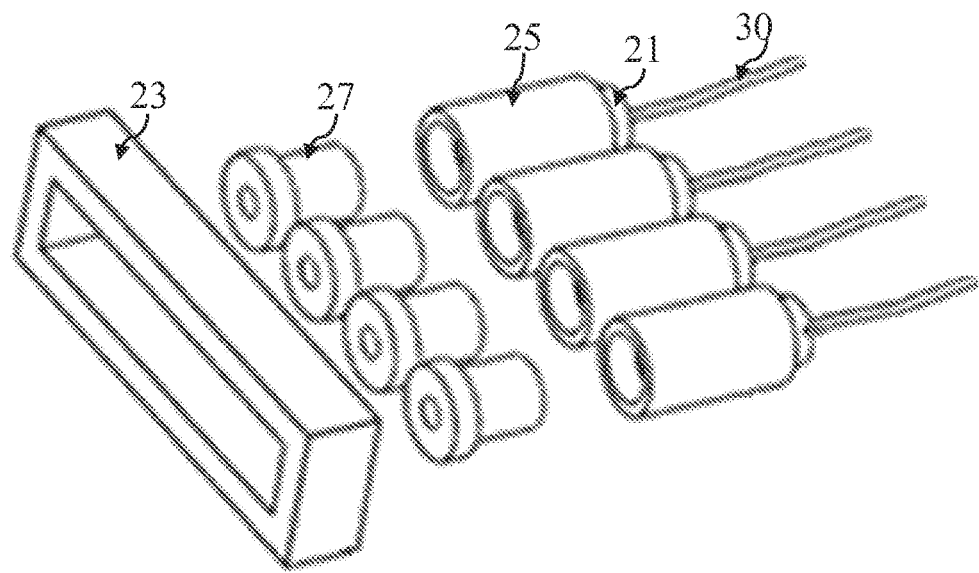
FIG. 5 is an exploded-view drawing showing an optical fiber positioning structure in an optical transceiver module, according to a third embodiment of the disclosure.

FIG. 5 is an exploded-view drawing showing an optical fiber positioning structure in an optical transceiver module, according to a third embodiment of the disclosure.

The third embodiment of the disclosure is an improvement stemming from the second embodiment shown in FIG. 3. Certain differences between the two embodiments are described as follows. The optical fiber positioning structure of the third embodiment additionally includes a plurality of orienting parts 27. The number of the orienting parts 27 is the same as the number of the second positioning parts 25. The orienting parts 27 are disposed between the first supporting part 23 and the second positioning parts 25, and are used to connect the first supporting part 23 and the second positioning parts 25 in a removable manner. In this embodiment, the accommodating portion of the first supporting part 23 matches the orienting parts 27.

Figure 6:
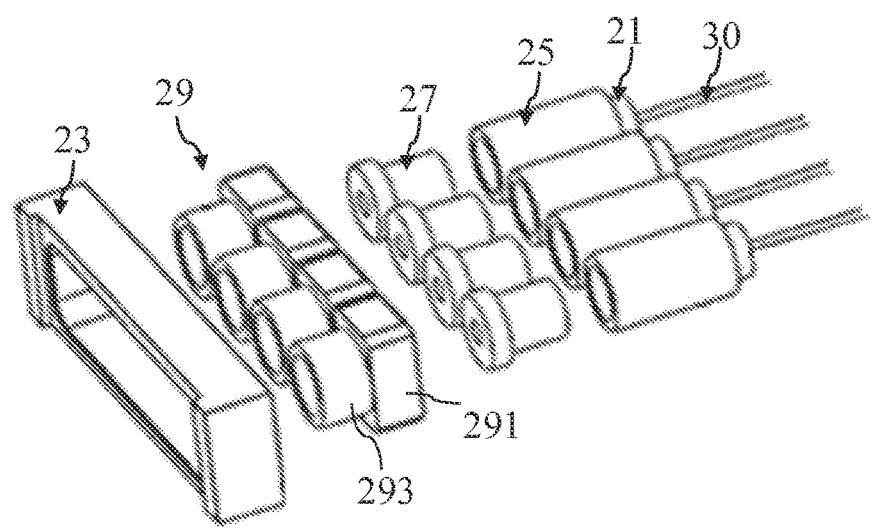
FIG. 6 is an exploded-view drawing showing an optical fiber positioning structure in an optical transceiver module, according to a fourth embodiment of the disclosure.

FIG. 6 is an exploded-view drawing showing an optical fiber positioning structure in an optical transceiver module, according to a fourth embodiment of the disclosure.

The fourth embodiment of the disclosure is an improvement stemming from the third embodiment shown in FIG. 5. The differences between the two embodiments are described as follows. The optical fiber positioning structure of the fourth embodiment additionally includes a lens assembly 29. The lens assembly 29 includes a deck 291 and a plurality of lenses 293 disposed on the deck 291. The number of the lenses 293 is the same as the number of the second positioning parts 25. The deck 291 is disposed between the first supporting part 23 and the orienting parts 27, and is used to connect the first supporting part 23 and the orienting parts 27 in a removable manner. In this embodiment, the accommodating portion of the first supporting part 23 matches the deck 291.

The lens assembly 29 can also be added directly onto the optical fiber positioning structure of the second embodiment. For example, the lens assembly 29 can be disposed between the second positioning parts 25 shown in FIG. 4 and the first supporting part 23, and is used to connect the second positioning parts 25 and the first supporting part 23 in a removable manner.

The orienting parts 27 and/or the lens assembly 29 can also be added onto the optical fiber positioning structure of the first embodiment. The details will not be repeated here.

In an actual application, the optical fiber positioning structures of the four aforementioned embodiments can be combined. For example, in an optical transceiver module, its transmitting end and receiving end use the same optical fiber positioning structures from one of the first through fourth embodiments. Alternatively, the transmitting end and receiving end of the optical transceiver module may use different optical fiber positioning structures from different embodiments.

Each of the optical fiber positioning structures from the four aforementioned embodiments can be used on either the transmitting end or the receiving end in an optical transceiver module.

Furthermore, the relative positions of the two optical fiber positioning structures used in an optical electrical transceiver module can be adjusted as needed. For example, the optical fibers on the receiving end and the transmitting end may be placed in substantially the same plane, or in two parallel planes. The positions of the optical fiber positioning structures that clamp and orient the optical fibers change accordingly. When the optical fibers on the receiving end and the transmitting end are placed in two parallel planes, the optical fibers on the receiving end and the optical fibers on the transmitting end can be disposed in either mutually mirroring positions or staggered positions, in order to minimize the inner space of the optical electrical transceiver module. The details on the specific structure will not be repeated here.

FIG. 7 is an assembly drawing of multiple optical fiber positioning structures of an optical transceiver module, according to an embodiment of the disclosure. In the embodiment illustrated in FIG. 7, the optical fiber positioning effects from the first embodiment and the fourth embodiment are combined.

Specifically, the optical fiber positioning structure 10 of the first embodiment is used at the receiving end of the optical transceiver module, and the optical fiber positioning structure 20 of the fourth embodiment is used at the transmitting end of the optical electrical transceiver module. At the same time, the two different optical fiber positioning structures 10 and 20 are connected to the same connector 40 via different optical fibers. As each optical fiber positioning structure has been described in the aforementioned structures, the details will not be repeated here.

Compared to current technologies, the optical transceiver module provided by this embodiment include optical fiber positioning structures that have more reasonable structures. Such optical fiber positioning structures can couple optical fibers more precisely in the optical transceiver module. Furthermore, there is improvement in the stability of the optical path transmission in the optical transceiver module in which the optical fiber positioning structures are set.

It should be understood that despite the descriptions of embodiments, there is not only one independent technical design for each embodiment. The disclosure is written simply for the purpose of clarity. Technical personnel in the field should treat the disclosure as a whole. The technical designs in various embodiments may be combined in appropriate ways to form other embodiments that can be understood by technical personnel in the field.

The series of detailed descriptions above are only intended to provide specific descriptions of feasible embodiments. The detailed descriptions are not to be construed as limiting the scope of protection for the disclosure. All equivalent embodiments or changes that are not detached from the techniques of the disclosure in essence should fall under the scope of protection of the disclosure.

What is claimed is:

1. An optical transceiver module comprising:
    an optical fiber; and
    an optical fiber positioning structure for fixing the optical fiber, said optical fiber positioning structure comprises:
        a first positioning part that fixes said optical fiber; and
        a first supporting part that fixes said first positioning part on a case of said optical transceiver module,
    wherein said first positioning part comprises a first end face, a second end face opposite to said first end face, and a first through-hole that connects said first end face and second end face,
    said optical fiber is fixed within said first through-hole,
    said first supporting part comprises an accommodating portion for accommodating said first positioning part, and said first positioning part is fixed in said accommodating portion,
    the shape of a main body of said first positioning part is a cylinder, two end faces of said cylinder respectively constitute the first end face and the second end face of said first positioning part, said optical transceiver module comprises a plurality of optical fibers, said optical fiber positioning structure comprises a plurality of said first positioning parts, said plurality of first positioning parts are disposed side by side in said first supporting part, each said optical fiber comprises a first end close to a side where a light transmitting interface and/or a light receiving interface of the optical transceiver module are located, the first ends of said optical fibers and the first end faces of said first positioning parts are disposed in substantially the same plane, said first positioning parts are fixed in the accommodating portion of said first supporting part by means of engaging, welding, or adhering, said first supporting part comprises a third end face close to a side where said light transmitting interface and/or said light receiving interface are located, and a fourth end face opposite to said third end face, the accommodating portion of said first supporting part includes a plurality of second through-holes that connect said third end face and said fourth end face, each said first positioning part is tightly fitted and connected to a corresponding one of said second through-holes of said first supporting part, the first end faces of said first positioning parts and the third end face of said first supporting part are disposed in substantially the same plane, wherein said first supporting part further comprises:
    a side surface that connects said third end face and said fourth end face; and
    an opening that connects to said second through-hole disposed on said side surface,
    said opening extending from the third end face to the fourth end face of said first supporting part.

2. The optical transceiver module according to claim 1, wherein the material of said first positioning parts are ceramics or resin.

3. The optical transceiver module according to claim 1, wherein said optical fiber is disposed within said first through-hole, and the position of said optical fiber relative to said first through-hole is adjustable.

4. The optical transceiver module according to claim 1, wherein said first positioning parts are disposed in said accommodating portion, and the positions of said first positioning parts relative to side accommodating portion is adjustable.

5. The optical transceiver module according to claim 1, wherein
    a first positioning slot or a first positioning projection is set on the outside of the main body of at least one said first positioning part, and
    a second positioning projection or a second positioning slot that matches said first positioning slot or first positioning projection is set in at least one second through-hole of said first supporting part.

6. The optical transceiver module according to claim 1, wherein said optical fiber positioning structure is disposed on a receiving end of said optical transceiver module.

7. An optical transceiver module comprising:
an optical fiber; and
an optical fiber positioning structure for fixing the optical fiber, said optical fiber positioning structure comprises:
    a first positioning part that fixes said optical fiber; and
    a first supporting part that fixes said first positioning part on a case of said optical transceiver module,
wherein said first positioning part comprises a first end face, a second end face opposite to said first end face, and a first through-hole that connects said first end face and second end face, said optical fiber is fixed within said first through-hole, said first supporting part comprises an accommodating portion for accommodating said first positioning part, and said first positioning part is fixed in said accommodating portion, the shape of a main body of said first positioning part is a cylinder, two end faces of said cylinder respectively constitute the first end face and the second end face of said first positioning part, said optical transceiver module comprises a plurality of optical fibers, said optical fiber positioning structure comprises a plurality of said first positioning parts, and said plurality of first positioning parts are disposed side by side in said first supporting part, each said optical fiber comprises a first end close to a side where a light transmitting interface and/or a light receiving interface of the optical transceiver module are located, and the first ends of said optical fibers and the first end faces of said first positioning parts are disposed in substantially the same plane, said first positioning parts are fixed in the accommodating portion of said first supporting part by means of engaging, welding, or adhering, said optical fiber positioning structure comprises a plurality of second positioning parts that fix the first positioning parts, said second positioning parts are disposed in said first supporting part, each said second positioning part comprises:
    a third end face close to a side where said light transmitting interface and/or said light receiving interface are located;
    a fourth end face set opposite to said third end face; and
    a second through-hole that connects said third end face and said fourth end face, and said first positioning parts match and connect within corresponding ones of said second through-holes.

8. The optical transceiver module according to claim 7, wherein said first positioning parts are disposed in corresponding ones of said second positioning parts, and the position of said first positioning parts relative to the corresponding ones of said second positioning parts is adjustable.

9. The optical transceiver module according to claim 7, wherein said second positioning parts are disposed in said first supporting part, and the position of said second positioning parts relative to the first supporting part is adjustable.

10. The optical transceiver module according to claim 7, wherein the shape of each one of said first through-holes and said second through-holes is a cylinder, an axis along an axial direction of each cylinder constitutes an axis of the corresponding first through-hole or second through-hole, and the axial length along the axis of said first through-holes of first positioning parts is greater than or equal to the axial length along the axis of said second through-holes of said second positioning parts.

11. The optical transceiver module according to claim 7, wherein said second positioning parts and said first supporting part are directly or indirectly connected in a removable manner.

12. The optical transceiver module according to claim 11, wherein
said first supporting part comprises a fifth end face close to a side where said light transmitting interface and/or said light receiving interface are located, and a sixth end face opposite to said fifth end face, and
the distance between a first one of the third end faces of said second positioning parts and the fifth end face of said first supporting part is the same as a second one of the third end faces of said second positioning parts and the fifth end face of said first supporting part.

13. The optical transceiver module according to claim 12, wherein
said optical fiber positioning structure further comprises an orienting part,
said orienting part is disposed between said first supporting part and said second positioning parts, and is used to connect said first supporting part and said second positioning parts in a removable manner.

14. The optical transceiver module according to claim 13, wherein
said optical fiber positioning structure further comprises a lens assembly,
said lens assembly comprises a deck and a plurality lenses placed on said deck, and
said deck is disposed between said first supporting part and said orienting parts, and is used to connect said first supporting part and said orienting parts in a removable manner.

15. The optical transceiver module according to claim 7, wherein said optical fiber positioning structure is disposed on a transmitting end of said optical transceiver module.

16. An optical fiber positioning structure for fixing an optical fiber to an optical transcriber module, comprising:
a first positioning part that fixes said optical fiber, said first positioning part comprising:
a first end face;
a second end face opposite to said first end face; and
a first through-hole that connects said first end face and second end face, said optical fiber being fixed within said first through-hole; and
a first supporting part that fixes said first positioning part on said optical transceiver module, said first supporting part comprising an accommodating portion for accommodating said first positioning part,
wherein the shape of a main body of said first positioning part is a cylinder, and
two end faces of said cylinder respectively constitute the first end face and the second end face of said first positioning part,
said optical transceiver module comprises a plurality of optical fibers,
said optical fiber positioning structure comprises a plurality of said first positioning parts, and
said plurality of first positioning parts are disposed side by side in said first supporting part,
each said optical fiber comprises a first end close to a side where a light transmitting interface and/or a light receiving interface of the optical transceiver module are located,
the first ends of said optical fibers and the first end faces of said first positioning parts are disposed in substantially the same plane,
wherein said first positioning parts are fixed in the accommodating portion of said first supporting part by means of engaging, welding, or adhering,
said optical fiber positioning structure comprises a plurality of second positioning parts that fix the first positioning parts,
said second positioning parts are disposed in said first supporting part,
each said second positioning part comprises:
a third end face close to a side where said light transmitting interface and/or said light receiving interface are located;
a fourth end face set opposite to said third end face; and
a second through-hole that connects said third end face and said fourth end face, and
said first positioning parts match and connect within corresponding ones of said second through-holes.

* * * * *